United States Patent [19]

Bowman et al.

[11] 3,961,139

[45] June 1, 1976

[54] TIME DIVISION MULTIPLEXED LOOP COMMUNICATION SYSTEM WITH DYNAMIC ALLOCATION OF CHANNELS

[75] Inventors: Robert A. Bowman, San Jose; Guenther Keith Machol, Saratoga, both of Calif.; Rene Henri Terlet, Romsey, England

[73] Assignee: International Business Machines Corporation, Armonk, N.Y.

[22] Filed: May 14, 1975

[21] Appl. No.: 577,507

[52] U.S. Cl. .......................... 179/15 AL; 179/15 A
[51] Int. Cl.² ............................................ H04J 6/02
[58] Field of Search ........ 179/15 AL, 5 BA, 15 BY, 179/15 A; 340/172.5

[56] References Cited
UNITED STATES PATENTS

| | | | |
|---|---|---|---|
| 3,172,956 | 3/1965 | Inose | 179/15 |
| 3,456,242 | 7/1969 | Luskin | 179/15 AL X |
| 3,483,329 | 12/1969 | Hunkins | 179/15 AL |
| 3,544,976 | 12/1970 | Collins | 340/172.5 |
| 3,597,549 | 8/1971 | Farmer | 179/15 AL |
| 3,600,518 | 8/1971 | McNeilly | 179/15 AL |
| 3,632,881 | 1/1972 | Graham | 179/15 AL |
| 3,639,694 | 2/1972 | Deutsch | 179/15 AL |
| 3,639,904 | 2/1972 | Arulpragasam | 340/147 R |
| 3,845,472 | 10/1974 | Buchanan | 340/163 |

*Primary Examiner*—David L. Stewart
*Attorney, Agent, or Firm*—Shelley M. Beckstrand

[57] ABSTRACT

In a time division multiplexed loop communication system, a plurality of terminals share one or more channels of a multichannel frame, with a second plurality of terminals assigned to different channels. The communications controller may dedicate one or more of the channels to one of the terminals automatically and dynamically. Alternatively, one of a plurality of terminals assigned to a particular channel group can interrupt the controller and become automatically selected for communication.

11 Claims, 5 Drawing Figures

TIME DIVISION MULTIPLEXED LOOP COMMUNICATION SYSTEM WITH DYNAMIC ALLOCATION OF CHANNELS

RELATED APPLICATIONS

This invention is an improvement with respect to copending application, Ser. No. 482,940 filed June 25, 1974 now U.S. Pat. No. 3,921,137 which issued Nov. 18, 1975 for Semistatic Time Division Multiplex Slot Assignment, by C. M. McClearn, Jr., et al, of common assignee.

A preferred embodiment of the invention is described in copending application, Ser. No. 577,495 filed May 14, 1975 for Apparatus for Control and Data Transfer Between a Serial Data Transmission Medium and a Plurality of Devices, by J. Cross, et al.

BACKGROUND OF THE INVENTION

1. Field of the Invention

This invention relates to communication systems in general and, more particularly, to time division multiplexed serial loop communication systems in which data is transmitted in one direction around a loop transmission means.

2. Description of the Prior Art

Loop data communications systems have been known for several years and several control techniques have been devised in order to allow a master terminal or controller to communicate with a plurality of I/O terminals connected to the loop. One advantageously simple technique involves a form of time division multiplexing in which various time slots (also referred to herein as "channels") are permanently assigned to I/O terminals. Messages to and from I/O terminals are transmitted in the permanently assigned channel. It is apparent that such a system is relatively inefficient for interactive I/O terminals since the communications capability of a permanently assigned time slot or channel is wasted during periods of inactivity of the associated I/O terminal.

To allow terminals to use time slots not being used by other terminals, addressed message communications systems have been developed wherein data in each slot is preceded by the address of the receiving or sending terminal. These systems are also inefficient because band width is consumed in transmission of addresses which would otherwise be available for data transmission. Furthermore, contention problems arise when two or more terminals attempt to transmit at the same time. Contention has been resolved in the prior art by having the master terminal poll each of the I/O terminals for messages or by hub polling wherein each I/O terminal, after being polled, polls the next I/O terminal. These polling procedures likewise reduce band width available for data transmission and further complicate the communication system.

One prior art attempt to permit one terminal to utilize slots which have been assigned to another terminal is described in S/N 482,940 filed June 25, 1974 for Semistatic Time Division Multiplex Slot Assignment, by C. M. McClearn, Jr., et al. In McClearn, et al, each terminal operating on the loop must be assigned to a different base slot. A psuedo device latch is provided which may be set by a Write Echo command addressed to a non-existent device type and communicated in the slot assigned to that terminal. This pseudo device latch is reset by an End Operation command addressed to the same non-existent psuedo device to which the Write Echo command was originally directed. With this protocol, it is not possible to attach a plurality of terminals to the loop so as to communicate in the same base slot, and a multiple command procedure is required to disable one terminal from operating in its own slot, and establish communication with a second terminal in that slot. In order to accomplish this, for example to permit terminal C to obtain and then reliquish slots assigned to terminals A and B, would require that the controller perform the following steps: Send separate Write Echo commands in slots assigned to terminals A and B and addressed to non-existent devices. Then, send a Set Modulus command to terminal C, so that terminal C will operate in A and B's slots. After processing the operation involving communication with terminal C, the controller must then send a Set Modulus command to C to reduce its modulus, thereby leaving A and B's slots free. Finally, End Operation commands must be sent by the controller addressed to the same non-existent devices as above in slots pertaining to both A and B.

Thus, in McClearn, at least six different commands must be communicated by the controller in at least three different slots in order for one terminal to utilize slots pertaining to just two other terminals. This protocol is sufficiently complex that its implementation in a practical system is very difficult, and can be inefficient in utilization of communication band width under some circumstances.

SUMMARY OF THE INVENTION

It is, therefore, an object of this invention to provide an improved loop communication system and terminal apparatus.

Thus, the invention provides a method and apparatus in connection with a data transmission system including a controller, a plurality of terminals interconnected in a serial loop for communication with said controller in time slots, adapter means in each said terminal for dynamically dedicating one or more of said slots to a given terminal. Dedication of a given terminal to communication in a particular slot may be initiated by the terminal or by the central controller. Each terminal is provided with a means responsive to information received on the loop for detecting the presence of a command message in a slot assigned to that terminal. Means are provided for comparing the address field of such command messages with the addresses assigned to attached devices. In the event that the addresses do not compare, means are provided for inhibiting execution of selected subsequently received commands and inhibiting generation of an Attention command by the terminal for loading onto the loop in an assigned slot. The terminal device will disable the inhibiting means upon receipt of a special command, or upon execution of a comman addressed to an attached device.

Thus, the invention provides a communication system which economically and efficiently uses communication lines. For example, whereas in a dedicatd channel system having a 16 channel frame as many as 16 terminals may be attached to the loop, herein is described a manner for attaching as many as 240 terminals to one loop by assigning as many as 15 terminals (for a 4 bit address field) to a given time slot, and permitting the sharing of those slots while minimizing the communication overhead associated with dedicating a slot to communication between a given terminal and the controller. So that a number of terminals may use the same time slot, a simple protocol is provided by the invention in order to reduce the message transmission time, the control hardware at the terminal, and the control microcode execution time at the controller. As will be more fully described hereinafter, this is done by providing in each terminal an automatic means of allowing one terminal to take over the slot and appear to the loop controller as the only terminal in the slot. This take over can be initiated at the controller or in one of the terminals. This is accomplished by using the device address that is associated with each command message on the loop and assigning a different device address to each terminal, or to each I/O device, or to each device controller that is assigned to the same time slot. A command issued by the controller during a given time slot will be executed by the terminal having a matching device address. A terminal will normally transmit any command it receives without alteration regardless of whether or not it is in Pass Mode. All other terminals assigned the same slot address will go into pass mode; that is, from this time on, they will pass along without alteration command and data that they receive. A terminal in pass mode is unable to send an Attention command to the controller and thus will not interrupt a dialogue between a selected terminal and the controller. With a single command it is then possible to have one terminal take over the slot and carry on an unlimited exchange of commands with the controller as though it was alone in this slot address. This state prevails until a Leave Pass Mode command is issued which is executed by all terminals and which enables them to receive any command, or to issue an Attention command; or until a device command is received, as described below.

In the prior art, a common method for a controller to find out if a terminal has a message to send is by polling. With polling, valuable time is spent interrogating each terminal in turn whether a message is there or not. On the other hand, in this invention, a single Attention command signals this fact to the controller and at the same time takes over the time slot for the terminal. The Attention command carries the terminal, or device, address. As it is passed along to the controller, down stream terminals on the loop in the same slot see it as a command and go into pass mode because the Attention was unsolicited—or arrives with a different address than that which would be expected. The controller "echos" the Attention command back to the terminal as a transmission check; and as this command is passed along the loop, it causes up stream terminals on the loop in the same time slot to go into pass mode. In this manner, the terminal has taken over the time slot and message exchanges are possible—as was the case when Pass Mode was initiated from the controller, as a terminal in Pass Mode cannot initiate an Attention command.

The invention also provides a way for a terminal to be selectively taken out of pass mode. In some cases, the loop controller may be delayed in completing a transaction with a first terminal, as may be the case when an injury must be made by the controller to a remote computer. It is then desirable to process another transaction while waiting, and afterwards selectively reconnect with the first terminal. This is accomplished in the following way. The loop controller issues a Leave Pass Mode command to free all terminals so that an Attention command may be issued by a second terminal so that it can take over the slot. The controller can later reconnect with the first terminal by issuing a command with the device address of an attached device of said terminal. When the first terminal detects a command with a matching device address, it will get out of pass mode and execute the command. In the meantime, the second terminal will go into pass mode because it sees a command with an unmatched device address. Thus, the controller can resume dialogue with the first terminal simply by sending it a command with the appropriate device address.

The foregoing and other objects, features, and advantages of the invention will be apparent from the following more particular description of preferred embodiments of the invention, as illustrated in the accompanying drawings.

DESCRIPTION OF THE PREFERRED EMBODIMENTS

Figure 1:
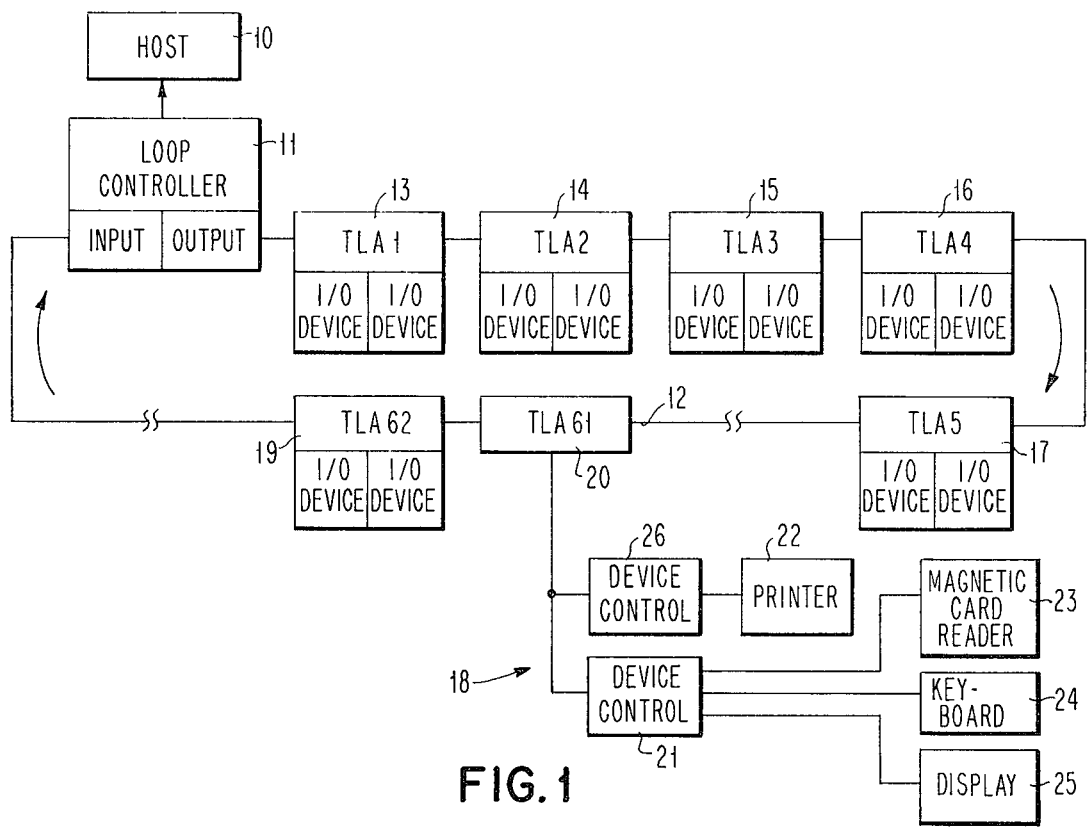
FIG. 1 illustrates a typical system configuration for utilizing the method and apparatus of the invention, including a computer, a loop controller, and a plurality of terminals, including input/output devices.

Referring now to FIG. 1, an example embodiment of the invention is shown in connection with a host computer 10, such as an IBM System 370 Central Processing Unit and related peripheral devices. A loop controller 11, such as the IBM 3601, is provided for connecting a loop communication link 12 to computer 10. Reference is made to C. M. McClearn, et al (cited above) in connection with FIG. 2 thereof for a description of a loop controller which is adaptable for use in the invention. Loop controller 11 provides for communication between computer 10 and terminals 13-19 by generating a plurality of frame slots which are used for synchronization purposes, and are separated by a plurality of time slots, each of which can be assigned to one or more terminals 13-19. For example, slot S1 may be assigned to terminals 13, 15, 17, and 19; slot S2 could be assigned to terminals 14, 16, and 18; and so forth. Herein, as in McClearn, et al, a loop frame may comprise a sync slot and 16 time slots.

As will be more fully described hereinafter, the invention provides an apparatus and a method by which controller 11 may dedicate a communications channel or slot—in this case a time slice of a time multiplex loop—to one of a number of terminals 13-19 sharing that slot automatically and dynamically. Thus, controller 11 may, for example, dedicate slot S1 to one of terminals 13, 15, 17, or 19. Further, as will be more fully described hereinafter, the invention provides a simple attention protocol permitting one of a number of terminals on a channel, or slot, to interrupt controller 11 and automatically become selected for communication. Thus, one of terminals 14, 16, or 18 may interrupt controller 11 to obtain exclusive use of slot 2 for communication of data from or to attached devices, of status information, and so forth, by loading into an empty assigned slot an Attention command. An "assigned slot" is one in which a terminal may communicate provided it is not in Pass mode: its base slot and all additional slots provided by a Set Modulus command—as is explained in the McClearn, et al, application.

Each terminal 13-19 includes a terminal loop adapter TLA 1, TLA 2, TLA 3, TLA 4, TLA 5, TLA 61, TLA 62. Each terminal loop adapter may have one or more input/output devices attached thereto through appropriate device control logic circuitry. For example, attached to TLA 61 are device controllers 26 and 21 which are respectively attached to a printer 22, magnetic card reader 23, keyboard 24, and display 25. Each device controller 21, 26, has its own unique address which may be permanently assigned by address switches or handwriting. Alternatively, each input/output device 22-25 may have its own unique device address.

A loop controller 11, adaptable for use in connection with the invention is more fully described in U.S. Pat. Application S/N 482,940 filed June 25, 1974 by C. M. McClearn, Jr., et al. Therein, minimal changes are required to implement the slot sharing method of the invention. Thus, as will be apparent to those skilled in the art, loop controller 11 may comprise the apparatus described in connection with FIG. 2 of McClearn, et al with no hardware changes, the only changes required being implementable in the control program resident in computer 13 of that application. Thus, the control program need only be additionally provided with the facility for issuing the herein defined Leave Pass Mode command, or the equivalent thereof, and should also provide a table of devices or terminals 13-19, sharing the same base slot address.

Figure 2:
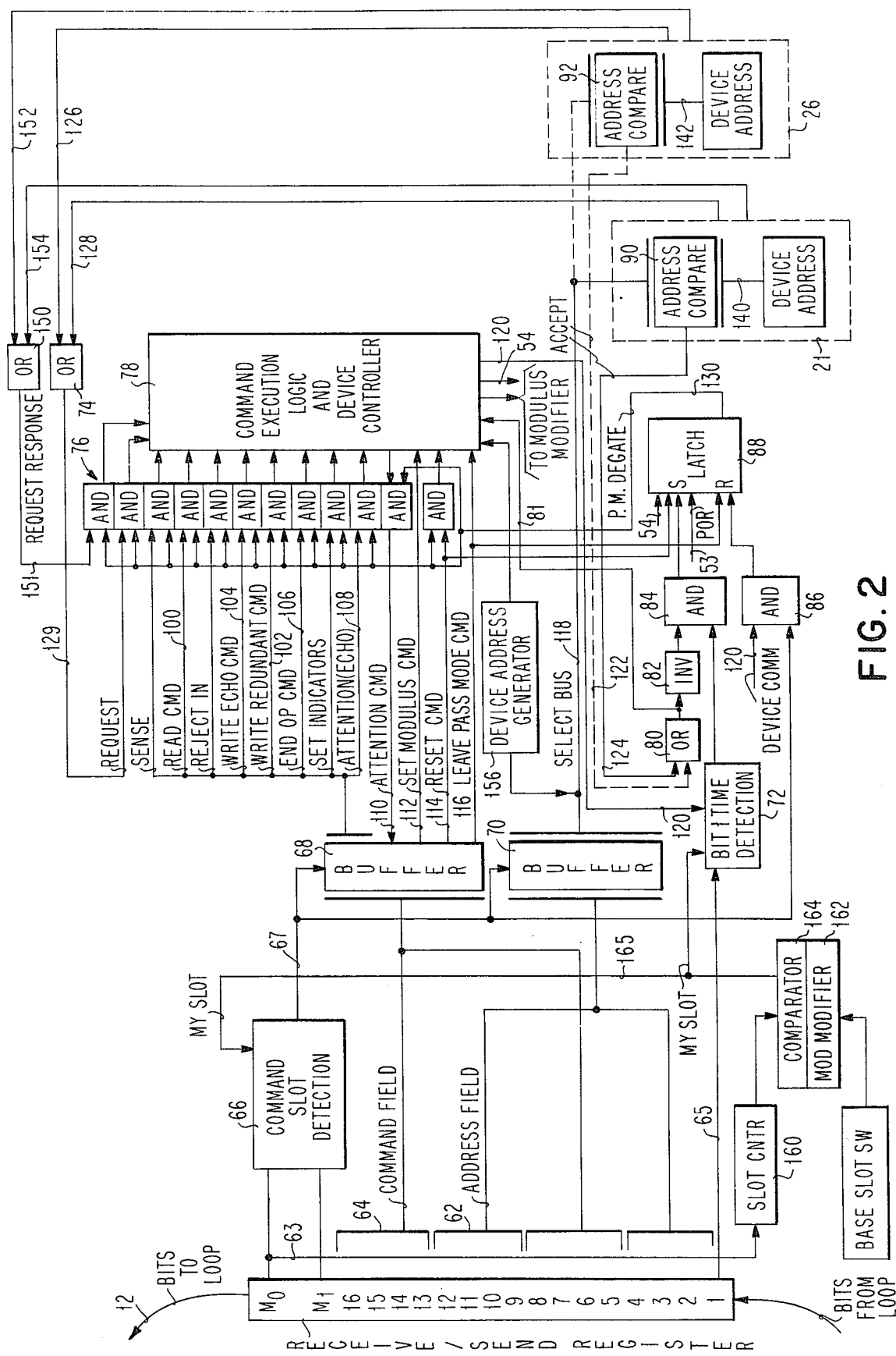
FIG. 2 illustrates logic circuitry for connecting a terminal comprising a plurality of input/output devices such as a keyboard, a printer, or a display to a loop communication line which operates in accordance with the invention.

Hereafter described in connection with FIG. 2 is one preferred embodiment of the terminal loop adapters of terminal devices 13 19. A second and preferred embodiment of those terminal loop adapters is described in connection with IBM Docket SA975027, J. Cross, et al, the teachings of which are incorporated herein by reference. That second embodiment describes a microprogrammed microprocessor for interfacing serial loop 12 with device controllers 21, 26, and I/O devices 22-25. The invention described herein represents an improvement over the above cited McClearn, et al, application—the teachings of which are also incorporated herein by reference, to the extent that they are applicable to the basic loop communication architecture. In the improvement provided by this invention with respect to the McClearn, et al, application, the sharing of slots is facilitated by a new terminal mode (Pass Mode), a new command (Leave Pass Mode), and an extention to the Attention command definition. In a typical operation, any terminal loop adapter in a slot group may bid for the use of the slot by sending an Attention command. Other terminals receiving this attention command or its "echo" from the controller are automatically forced into Pass Mode. Alternatively, the controller can directly force all but one terminal of a group sharing a slot into pass mode by issuing a device command (one addressed to a specific device) to the desired terminal, forcing all others in the group into Pass Mode. Any terminal in Pass Mode will retransmit the loop bits without alteration.

At the completion of a transaction (such as data transfer through a plurality of slots), the loop controller may issue a Leave Pass Mode command, whereupon all terminals in the group will revert to an idle state, able again to bid (by issuing an Attention command) for the use of the slot. Alternatively, the controller may issue any of the device commands (Read, Sense, Write Redundant, or Write Echo) addressed to any of the terminals in the group, even though any or all of them may be in Pass Mode. The selected terminal will execute the command and leave Pass Mode, whereas all the other terminals in the group will not execute the command and will remain in or revert to Pass Mode. A terminal will go into Pass Mode under any of the following conditions:

1. Power On Reset, or on the execution of the Reset command;
2. Receipt of an unsolicited Attention command;
3. Receipt of an Attention command echo having an address of a device not matching that of the Attention command sent by the terminal;
4. Attempted transfer of a device command addressed to an unattached device.

The terminal will leave Pass Mode on the receipt of a Leave Pass Mode command, or on the execution of Read, Sense, Write Redundant, or Write Echo command addressed to an attached device.

Referring now to FIG. 2, a representative implementation of the major components of an embodiment of a terminal adapter according to the invention are shown. These components include the receive/send register 60, the command decode and encode logic 68, the pass mode control logic 88, the command execution logic 78, and the device address compare logic 90, 92 which herein resides in the attached devices 21, 26. Alternatively, address comparing may occur in device control 78, as is noted below. Send/receive register 60 is used to assemble the 18 bits of data or command (as one slot is 18 bits in length, as is described in McClearn, et al, application, cited above) received from controller 11 during a slot time assigned to the TLA 20. Similarly, it is used to shift out to loop 12 data or commands to be sent to controller 11 during the assigned time slot. In the copending application of Cross, et al, these bits are assembled into locations in RAM.

The format of the 18 bits making up a slot is as follows:

Bits M0 and M1 identify a command or a data slot.
Bits 1-8 and 9-16 carry the command or the data.

During a command slot, the two bytes (8 bits each) are identical, and this redundancy is used as a check on transmission. Command decode and encode logic base slot switch 158 is provided for the purpose of identifying the base slot assigned to the terminal. Slot counter 160 is provided for counting the number of slots from the frame sync slot and is fed together with the output of base slot switch 158 to comparator 164, which signals on line 165 when the base slot assigned to the terminal appears in register 60. Modulus modifier 162 is provided for enabling an output on My Slot line 165 when the temporarily assigned slots are allocated in addition to the base slot. Command slot detector 66 is responsive to bit M0 of this slot for signaling on line 67 the occurrence of the command in My Slot. Address field 62 is loaded into buffer 70 and command field 64 is loaded into buffer and decode circuit 68 when command slot detector 66, enabled by My Slot signal on line 165, provides an output on line 67. The output of command decode buffer 68 appears, for example, on lines 100, 102, 104, 106, 108, 112, 114, 116 representing the commands Sense, Read, Reject In, Write Echo, Write Redundant, Reject Out (not shown), End Operation, Set Indicators, Attention (which may be an Echo, or not), Set Modulus, Reset, and Leave Pass Mode. Each of these is fed to the command execution logic in device controller 78; however, all but Set Modulus command 112 and Leave Pass Mode command 116 are gated by AND circuits 76 which are enabled or disabled by a signal on line 130 from pass mode latch 88. The input to command buffer 68 is the Attention command (which functions as a service request) from command execution logic and device controller 78 along line 110, which is also gated by AND gate 76, which also in this case is selectively enabled or disabled by pass mode degate line 130 from pass mode latch 88. Address field 62 is loaded into buffer 70, or from buffer 70 as the case may be. Select bus 118 interconnects buffer 70, device address generator 156, and the address comparators 90 and 92 in devices 21 and 26, respectively. The other inputs to address comparators 90 and 92 are the device address switch lines 140, 142 respectively. Device address generator 156 operates under control of device controller 78 for polling devices 21, 26.

Bit 1 time detector 72 is enabled by command execution logic 78 when a command or data is to be sent to a device and, in turn, enables AND gate 84 a certain time after the last bit in My Slot is received. In addition, Line 120 from command execution logic 78 may enable AND gate 86 in the event that a device command (as previously defined) is decoded in buffer 68.

In order to keep all terminals sharing a given base slot also sharing the same additional slots, means 44 is provided for executing a Set Modulus command which occurs in My Slot irrespective of whether or not the terminal is in Pass Mode. Means 43 for detecting My Slot is therefore enabled to detect both the base slot and all other slots assigned in common to a group of terminals.

Lines 122, 124 from address comparators 92 and 90, respectively, are ored in OR gate 80 and inverted at 82 to form one input to AND circuit 84.

Pass mode latch 88 is set by a signal on Reset command line 114, a signal from AND gate 84, by a power on reset signal on line 53 by an unsolicited Attention on line 108, or a miscompare on the Attention command address—both signalled on line 54. Pass mode latch 88 is reset by an output from gate 86 or by a Leave Pass Mode command signal on line 116. When set, pass mode latch 88 provides a pass mode degate signal on line 130 disabling operation of AND gates 76.

An address accept signal on either of lines 122, 124 is fed along line 81 to command execution logic 78. The other inputs to device controller and command execution logic 78 are request response from OR gate 150 or request from OR 74 indicating that either of devices 21 or 26 have raised a request response line 152, 154 or a request line 126, 128.

The details of slot counter 165 and My Slot signal generator (including elements 160, 158, 162, and 164) are more fully described in the copending applications of Cross, et al, and McClearn, et al, cited above.

The operation of command execution logic and device controller 78 will become more fully apparent in connection with the following description of the operation of the circuit of FIG. 2. Similarly, as will be apparent to those skilled in the art the apparatus described in the copending application of cross, et al, may be adapted for use as command execution logic and device controller 79 to perform the functions as will hereinafter be described.

In operation, command decode and encode logic 66, 68 senses bits M0. When bit M0 equals one, a command slot is detected and the decode logic 68 is enabled. Decode logic 68 operates on the four address bits 64 of command byte 62, 64. Some of the decoded commands are controlled by the pass mode logic, including pass mode degate line 130. Two others are always executed. They are the Set Modulus command 112 and the Leave Pass Mode command 116. Command execution logic 78 dispatches commands to the attached devices 21, 26, controls transfer of data between loop 12 and the devices 21, 26, dispatches commands to the loop 12, and executes commands. (These operations are described in the application of C. M. McClearn, et al.)

While a number of input lines have been shown to command execution logic 78 representing the various commands, these are representative, merely, of those commands which may be included within a particular architecture. As, for the most part, they are not crucial to the invention, it is not necessary to describe the manner in which execution logic operates upon them. They merely are shown to illustrate that their execution is selectively enabled and inhibited under control of pass mode latch 88, except for selected commands, such as leave pass mode line 116 and set modulus line 112, for example.

While is possible to attach more than one device 21, 26 to the terminal loop adapter 20 interface, with each device 21, 26 having a different address, since 15 device addresses can be associated with one slot time (inasmuch as a four bit address field 62 is used), attaching more than one (uniquely addressed I/O) device 21, 26 to a terminal reduces the number of separate terminals that can be attached a given slot of loop 12.

Logic that the terminal uses for slot sharing includes request line 129, request response line 151, accept lines 122, 124, and address compare logic 90, 92. Request line 129 is used to inform TLA 20 that a device 21, 26 has data or a service request (i.e., Attention) to send to controller 11. Address compare logic 90, 92 generates an accept pulse 122, 124 whenever the terminal 18 receives a device command 64 in My Slot matching its device addresses 140, 142. Herein, four bit device address 62 is carried in bits 9 to 12 of the receive/send register 60 during a command slot. This address field is then placed on select bus 118 for comparison with the device addresses 140, 142. The device 21, 26 with a matching address will then generate accept pulse 122, 124; if there is no comparison, accept lines 122, 124 will stay off.

Address compare logic 90, 92 is also used to generate the device address 62 of an Attention command 110. A device 21, 26 will raise request line 129 when requiring service; for example, when a keyboard is operated—and has a new character to transfer to the controller. The command execution logic 78 will respond to line 129 if it is not degated by AND 76 to poll the devices 21, 26 by incrementing in device address generator 156 the address placed on select bus 118 until a request response 151 is received when select bus address compares with address 140 or 142. This value is then placed in address field 62 of the send/receive register 60 while an Attention command 110 is placed in the command field 64, and is stored also in device controller 78 awaiting an Attention Echo.

The operation of the pass mode control logic of FIG. 2 will now be described for the execution of a command slot received in My Slot, and for the generation of an Attention command.

When a device command 64 is received in My Slot, pass mode latch 88 is reset and address field 62 is gated to select bus 118. If a match occurs in comparators 90 or 92, accept pulse 122 or 124 will enable (on line 81) command execution logic 78 to execute the command decoded at buffer 68 from command field 64, as pass mode latch 88 had been reset.

However, if an accept pulse 122 or 124 had not been received by bit 1 time 72, then pass mode latch 88 is set and the pass mode degate line 130 inhibits execution of the device command, as AND gates 76 are disabled. Until pass mode latch 88 is again reset, the TLA remains in pass mode, and will not execute any of the commands degated by AND 76. In this manner only the TLA with a matching device address 62 will be able to communicate with controller 11. Also, request from devices 21, 26 appearing on line 129 attached to a TLA in pass mode (latch 88 set) will be ignored and no Attention command 110 can be executed for interrupting controller 11.

While in pass mode, commands will continue to be assembled into the receive/send register 60 but will be ignored while the pass mode latch 88 is set, except for two commands: the Set Modulus command 112 and the Leave Pass Mode command 116. The first leaves the terminal loop adapter in pass mode. The second resets pass mode latch 88, in which case the command's execution logic 78 is enabled. The Leave Pass Mode command is not device address 62 dependent.

An Attention command is assembled in receive/send register 60 when a request signal is received on line 129, when the command execution logic 78 is not executing another command, and when the terminal loop adapter is not in pass mode (pass mode latch 88 is reset.) Command execution logic 78 adds the address field 62 to the Attention command having determined the value by polling devices 21, 26 in response to request 126, 128—loading the contents of select bus 118 into address field 62 when request response 151 appears. The Attention command is then sent to controller 11 during the same or next My Slot time. Controller 11 then responds by transmitting an Attention Echo command with the same device address in address field 62. The terminal that initiated the command will have an equal comparison in the address field 62 with the device address saved in device controller 78 and will continue to be able to receive other commands. All other terminals assigned to the same slot will be in pass mode. When a downstream terminal receives the Attention command, it recognizes that it has no echo pending and sets its pass mode latch 88. An upstream terminal will go into pass mode, in the same way, when it receives the Attention echo that is transmitted by the controller.

Figure 3:
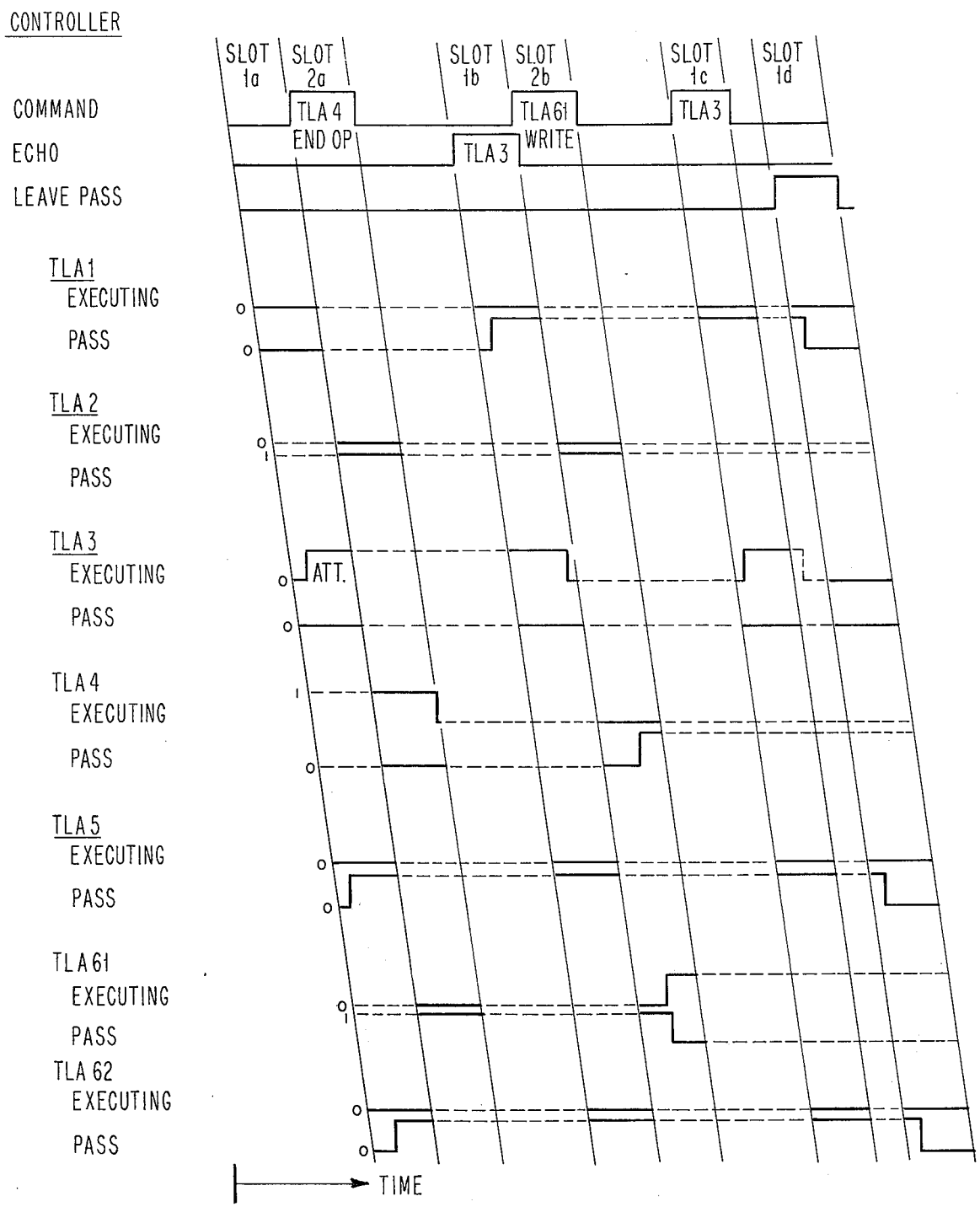
FIG. 3 is a state diagram for illustrating the operation of the invention in connection with the system of FIG. 1.

Referring now to FIG. 3 in connection with FIG. 1, an explanation of the method of the invention will be provided. FIG. 3 represents a state diagram showing the operating state of controller 11 and of terminals 13-19 during illustrative operations. Shown are a series of occurences of slots 1 and 2 and the state of the various terminals 13-19 during the occurence of those slots.

The state of each terminals 13-19 is shown in connection with lines representing executing mode and pass mode. For purposes of description of the FIG. 3, a terminal is in executing mode when it is executing a command received from the controller or sending to the controller an Attention command, as will be more fully explained hereafter.

A dotted line indicates that the terminal ignores that slot because it is not My Slot and the solid lines indicate the state of the terminal during illustrated My Slots. As shown, a particular time slot first appears at the output of the controller and then appears in succession at each of terminals 13-19, with the slot being offset slightly in time to illustrate the delay which occurs at each terminal. The three controller lines or states shown are command, echo, and leave pass mode. The loop controller commands are more fully described in FIG. 1 of the McClearn, et al, application, and previously in connection with FIG. 2. Two of those commands are Attention Echo and Leave Pass Mode, and because of their pertinence to the slot sharing concepts of this invention are shown in FIG. 3.

Referring now to FIG. 3, the four occurrences of slot 1 will be used for illustrating the manner in which a terminal obtains exclusive use of a slot, and the affect of the controller issuing a Leave Pass Mode command. Referring now to slot 1a, all terminals operating in slot 1 are idle: that is neither in Pass Mode nor in Executing Mode. As slot 1a reaches TLA 3, TLA 3 recognizes that slot is My Slot and loads an Attention command having an address field corresponding to one of its attached I/O devices. Upon receiving in slot 1a, TLA 3's Attention command, TLA's 5 and 62 go into Pass Mode. In slot 1b, the controller sends out an echo of the Attention command it received from TLA 3. TLA 1, upon receiving that Attention Echo in slot 1b, goes into Pass Mode. TLA 3 then receives the echo from the controller. At this point in the processing slot 1 now is dedicated to TLA 3, and all other terminals in the group sharing slot 1 are in Pass Mode. In the slot 1c, the controller issues a command addressed to TLA 3, which TLA 3 will execute: the other terminals operating in slot 1 will ignore that command and pass along without altering all data received in slot 1. slot 1d, as illustrated in FIG. 3, occurs many frames later: during which in an intermediate frame it is assumed that an End Op command has been issued to TLA 3 by the controller so as to end TLA 3's execution mode. In slot 1d, as illustrated, the controller issues a leave Pass Mode command. Upon receiving this command, TLA 1, TLA 5, and TLA 62 all leave pass mode, leaving all terminals operating in slot 1 idle.

Referring to FIG. 3, the operation of slot 2 illustrates the manner in which the controller changes the terminal operating in a slot. As illustrated, TLA 2, TLA 4, and TLA 61 operate in slot 2. At the beginning of the operation illustrated in FIG. 3, TLA 2 and 61 are already in Pass Mode, and TLA 4 is executing an input/output operation of some type. As illustrated in slot 2a, the controller issues an En Operation command to TLA 4, whereupon TLA 4 completes execution. In slot 2b, the controller issues a Write command to TLA 61. Upon receiving that command TLA 2 remains in pass mode, TLA 4 goes into pass mode, and TLA 61 leaves pass mode to execute the command.

Figure 4:
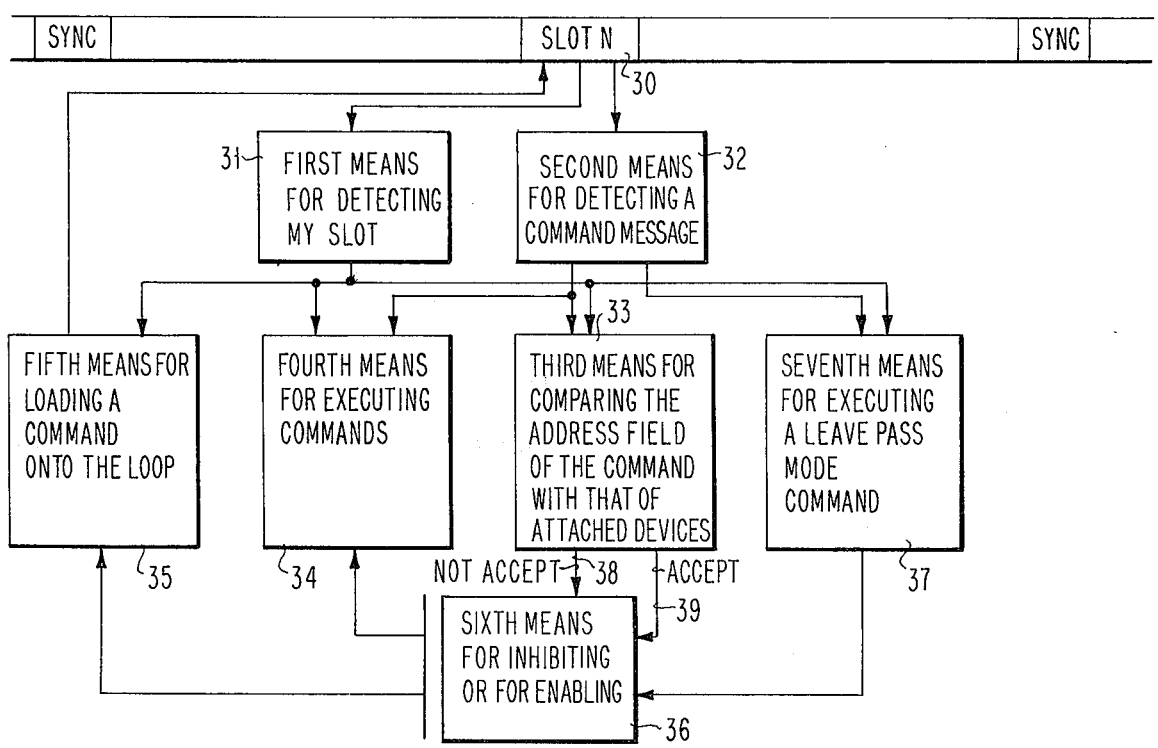
FIG. 4 is a functional diagram showing the interrelationship between the various means requiring to implement one embodiment of the invention.

Referring now to FIG. 4, an explanation will be given of the basic apparatus required in each terminal 13-19 to implement the invention. Each terminal is provided with first means 31 for detecting My Slot, which is defined as the base slot of the terminal and any temporarily assigned slots. Reference is made to the copending application of Cross, et al, for a more thorough description of an apparatus for performing this function. Also provided is second means 32 for detecting the presence of a command message in a slot. As will be apparent from McClearn, et al, application, this comprises means for detecting a one bit in the MO position of My Slot. Third means are provided, responsive to the detection of a command message in My Slot, for comparing the address field of the command with that of the attached input/output devices. This third means normally resides in the I/O device, may be in adapter 20, —or both may share this compare function—for different commands. Third means 33 provides two outputs 38, 39, for signalling that the address is acceptable, or not acceptable, as comparing or not comparing to the address of the attached device. Alternatively, the off or on condition of a signal line can perform this function. Fourth means 34 are provided responsive to the detection of a command message in My Slot for executing the command. Also, fifth means 35 are provided for loading a command, such as an Attention command onto the loop in My Slot 30. Seventh means 37 is provided responsive to the receipt of a Leave Pass Mode command for executing the same. Sixth means 36 is provided responsive to the lack of comparison of the address field of a command received in My Slot with that of the addresses of the attached devices (on line 38) for inhibiting execution of all other commands, including the loading of an Attention command onto the loop. Sixth means 36 may be reset so as to enable operation of the fourth and fifth means upon receipt of a device command having an address field which compares with that of an attached device (signaled on line 39) or the execution of a Leave Pass Mode command by seventh means 37.

Figure 5:
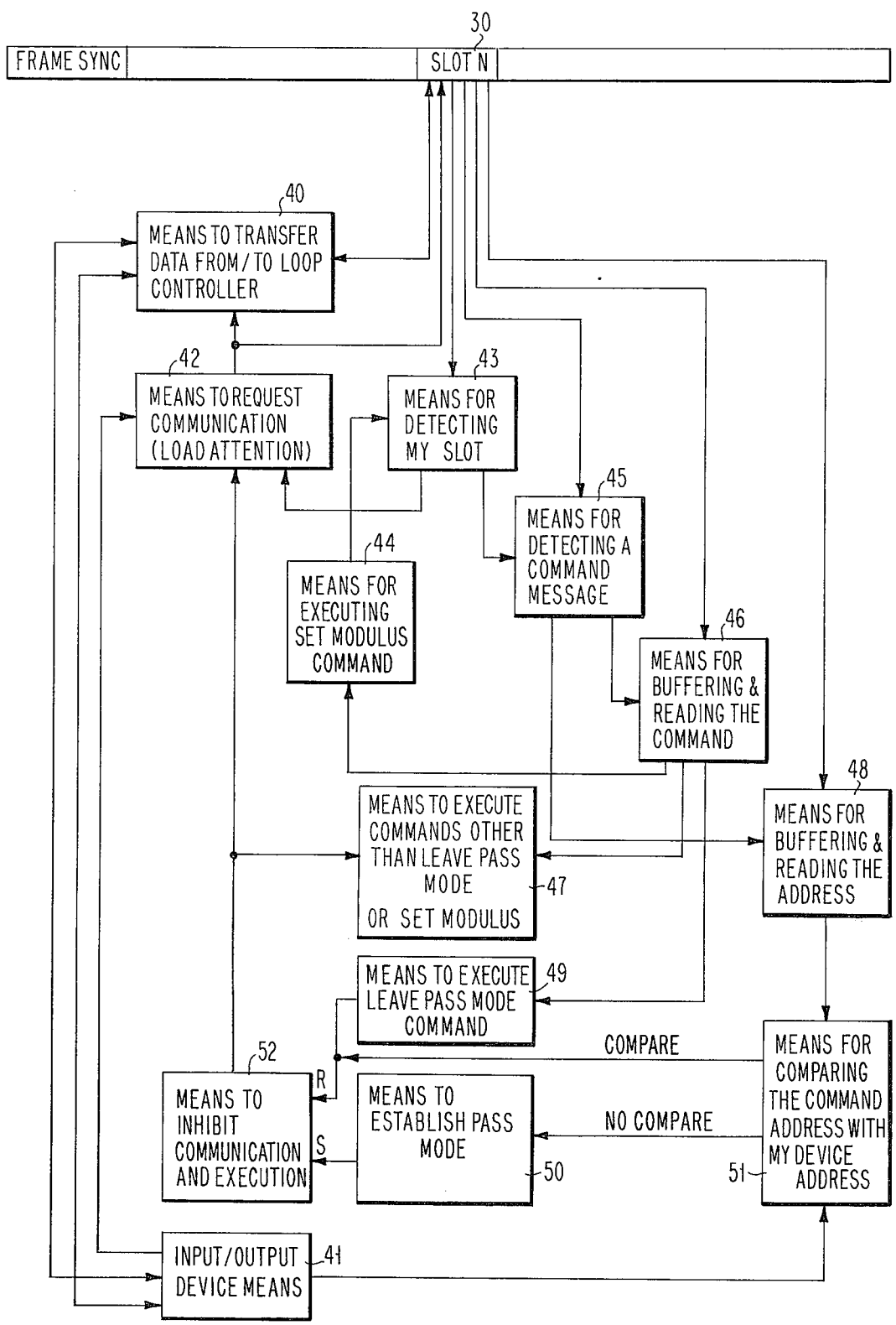
FIG. 5 illustrates the relationship between various functional devices for implementing a further embodiment of the invention.

Referring now to FIG. 5, an explanation will be given of the basic apparatus required to implement the Pass Mode and Set Modulus modes of operation of the invention. When operating in the pass mode of the invention, the Set Modulus command as described in McClearn, et al, takes on additional new power. Each of the plurality of terminals attached to the loop may require no communication band width at all, or maybe require a very high data transfer rate (high band width). By use of the Set Modulus command, additional slots may be assigned for the use of a given terminal. Previously, if a terminal had been given additional slots by a receipt of a Set Modulus command, and was not communicating, a great deal of the communication band width available was being wasted. By use of the Pass Mode and the Set Modulus command, groups of slots or channels may be assigned together to one of a plurality of terminals, such that terminals which do not require any communications time (or band width) are provided none, and the terminal which requires high band width is provided time in his own base slot and in additional slots.

At least two set modulus protocols may be implemented. First, all terminal devices assigned to the same base slot address must have the same modulus, or additional slots, assigned to them. Second, devices operating on the same base slot may be assigned different modulus slots. In the explanation which follows, the first alternative is described. In order to implement the second alternative, it is necessary to provide that the Set Modulus command will be executed by a terminal only if it is not in pass mode, and loop controller 11 must maintain a log of which channels are available to each terminal.

Referring now to FIG. 5, means 43 are provided for detecting My Slot and means 45 for detecting a command message in that slot.

In the event that a command is detected in My Slot, means 46 and 48 are provided for respectively buffering the command field and the address field. Input/output device means 41 comprises, for example, a printer, a magnetic card reader, a keyboard or display, and has associated with it a device address. Means 40 is provided for transferring data from I/O device 41 to the controller through slot 30 on loop 12 or for transferring data from slot 30 to I/O device 41. Means 42 is provided for interrupting the controller by loading an Attention command into slot 30 indicating that device 41 requires servicing. Of course, means 42 will only load Attention into slot 30 in response to detecting means 43 signaling the occurence of My Slot. In order to permit a plurality of devices to share the same slot, means 52 is provided for inhibiting communication in My Slot, such as by inhibiting execution of selected commands if the terminal is in Pass Mode. Means 52 is set, in order to inhibit operation of attention means 42 and execution of selected commands by means 47, by means 50 for establishing pass mode. Means 50 establishes pass mode (by setting inhibit means 52) in the event that means 51 signals lack of comparison between the command address field and the device address. Means 52 is reset so as to enable communication in slot 30 and execution of commands by means 47 if means 49 executes a Leave Pass Mode command received in My Slot, or by the receipt of a command in My Slot having a device address field which compares with the address of I/O device 41.

Means 44 is responsive to receipt of a Set Modulus command in My Slot, irrespective of inhibit means 52, for assigning additional slots to the terminal—which will become, thereby, My Slots in future frames.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A communication adapter for interconnecting one or more input/output devices with a central controller over a serial communication loop in fixed length time slots, where a plurality of said adapters are operable in one of said time slots and at least one other adapter is operable in at least another of said time slots, comprising:

first means responsive to information signals on said loop for providing a my slot signal indicating the occurrence of said at least one of said time slots;
second means responsive to information signals on said loop for providing a slot command signal signifying the presence of a command message;
third means for receiving an accept signal from said devices signifying that the address field of the command message corresponds to an address assigned to an attached input/output device;

fourth means including means responsive to said my slot signal and said slot command signal for executing the command field of said command message;

fifth means responsive to said my slot signal for loading a command message onto said loop;

sixth means responsive to the presence and absence of said accept signal for respectively enabling and inhibiting operation of the fourth and fifth means;

whereby the adapter is operative to communicate in its assigned slot or to execute commands appearing therein only if operation of the fourth and fifth means is not inhibited.

2. The apparatus of claim 1 further including seventh means responsive to said my slot signal and said command slot signal, and one specific command message for conditioning said sixth means to enable operation of said fourth and fifth means, whereby the adapter, once rendered inoperative, is subsequently enabled, by execution of said specific command or of a command addressed to an attached input or output device, to communicate in said slot or execute other commands occuring therein.

3. The apparatus of claim 1 further including eighth means responsive to said my slot signal and said command message signal independently of said sixth means for executing a different specific command message to alter the number of slots comprising said at least one of said time slots.

4. In a data transmission system including a central controller and a plurality of terminals interconnected in a serial loop for communication with said controller in time slots, adapter means in each said terminal for dynamically dedicating one or more of said slots to a given terminal comprising;

detector means responsive to information received on said loop for signalling the presence of a command message in a slot assigned to said given terminal;

address comparison means responsive to the address field of said command message for signalling correspondence between said address field and the address of an attached device;

command execution means for executing the command contained in the command field of said command message;

inhibiting means operative when said address means does not signal correspondence for providing a pass mode degate signal;

gating means responsive to said pass mode degate signal for inhibiting execution of selected received commands and generation of an attention command for loading onto said loop;

whereby a plurality of terminals can share the same loop slot, and one terminal can obtain exclusive use of that slot.

5. In a loop transmission system, means in each terminal for enabling a plurality of devices to share the same time slot, comprising:

first means for detecting that the assigned time slot contains a command;

address decoding means, responsive to said first means, for decoding the address field in said time slot;

second means, responsive to said address decoding means detecting that the address is not that of said terminal, for generating a pass mode signal, third means responsive to the presence of the pass mode signal for disabling generation of a command message for establishing communication with the controller, and for passing on all commands and data appearing in its assigned time slot, command decoding means, responsive to said first means, for decoding the command field in said time slot, said second means being responsive to said command decoding means detecting a leave pass mode command, or said address decoding means determining that the address is that of the terminal, to disable said pass mode signal.

6. A communication adapter for interconnecting one or more input/output devices with a serial communication loop, comprising:

base address switch means for specifying the base slot address of said communication adapter;

modulus modifier means for specifying additional slots allocated to said adapter;

allocated slot detecting means responsive to said base address switch means and said modulus modifier means for generating a my slot signal signifying the slot received on said loop is allocated to said adapter;

command slot detection means responsive to said my slot signal for detecting the presence on said loop of a command message, having a command field and an address field;

device address comparison means responsive to said command slot detection means for generating an accept signal provided said address field corresponds to a device attached to said adapter;

command execution means for executing commands received in said command field on said loop and for generating an attention command for transmission to said loop;

means responsive to failure of said address comparison means to generate said accept signal for generating an inhibit signal inhibiting generation of said attention command or execution of certain received commands by said command execution means;

said command execution means being responsive to a set modulus command for altering said modulus modifier means irrespective of said inhibit signals, and responsive to a leave pass mode command for disabling generation of said inhibit signal;

whereby a plurality of communication adapters can share one or more time slots in a loop communication system, and a given one of said adapters can obtain exclusive use of a slot or group of slots.

7. A terminal apparatus adapted for communication over a serial communication loop in one or more time slots of a multi-slot frame, said apparatus comprising:

first means for receiving data communicated on said loop;

second means responsive to said first means for identifying the assigned time slots in said frame in which said terminal may communicate;

third means responsive to said first and second means for detecting the presence of a command message in a communication slot assigned to said terminal apparatus;

fourth means for decoding the command in said command message and for identifying said command as a device command, as a first control command, as a second control command, or as another command;

fifth means responsive to said third means for executing commands;

sixth means for generating device addresses assigned to said terminal;

seventh means for loading a command message into a slot in which said terminal may communicate, said command message including a device address assigned to said terminal;

eighth means for detecting correspondence between the address field of a device command and a device address assigned to said terminal;

ninth means defining a pass mode state for selectively inhibiting operation of said fifth and of said seventh means;

said ninth means being set into said pass mode state by receipt in an assigned time slot of a device command addressed to a device not assigned to said terminal;

said ninth means being reset from said pass mode state by receipt in an assigned slot of a device command, or of said first control command;

said fifth means being operative to execute said first and said second control commands irrespective of said ninth means;

said second means being responsive to said fifth means executing said second control command for adding or deleting assigned time slots; and tenth means for communicating data between said terminal and said communication loop in assigned time slots in response to a device command addressed to an attached device.

8. A time division multiplexed loop communication system, comprising;

a communications controller;

a plurality of terminals interconnected in a serial loop with said controller;

means in said terminals for assigning each said terminal to one or more communication channels;

means in said controller for transmitting in a channel a command message addressed to one of said terminals;

means in each said terminal set by a command message received in one of its assigned channels addressed to another terminal for inhibiting communication in any of its assigned channels;

means in each said terminal for resetting said inhibiting means upon receipt in one of its assigned channels of a command addressed to the terminal or of a leave pass mode command;

means in each said terminal, responsive to said inhibiting means being reset, for loading a command message into one of its assigned channels;

means in said controller, responsive to receipt of a command message from a terminal for transmitting an echo command addressed to that terminal;

whereby said controller may dedicate a channel to a specific terminal, and, alternatively, a terminal assigned to a channel may obtain exclusive use thereof for communication on said loop.

9. A method for selectively dedicating a channel in a time multiplexed serial loop transmission system to a selected terminal, such that a plurality of terminals may share the same channel, each said terminal performing the method comprising the steps of:

sensing the presence of a command message in a shared channel;

inhibiting further communication in said shared channels if said command is addressed to a different terminal assigned to share said channel until a subsequent command message addressed to said terminal or a leave pass mode command is received in an assigned channel;

initiating communication in its shared channels if communication is not inhibited by transmitting in an available shared channel a command message including its own address.

10. A method for selectively allocating a channel in a time multiplexed serial loop communication system including a loop controller to one of a plurality of terminals sharing said channel, comprising the steps of:

sensing the occurence of said channel on said loop, enabling allocation of said channel to a first terminal, provided communication by said first terminal is not inhibited, said allocation comprising the steps of said first terminal transmitting in said channel an attention command including its terminal address; or in the alternative, said controller transmitting in said channel a device command addressed to said first terminal;

inhibiting communication by said first terminal in said channel by transmitting therein a command including the address of another terminal, once again enabling allocation of said channel to said first terminal by said controller:

issuing in said channel a leave pass mode command; or in the alternative, issuing in said channel a device command addressed to said first terminal.

11. A time division multiplexed loop communication system, comprising:

a loop controller means;

a plurality of input/output terminal means interconnected with said controller in a serial loop for communicating in selected channels of a multi-channel frame;

said controller including means for receiving and transmitting in said channels data messages, command messages including a command field and an address field, and null messages;

each said terminal means including first means for storing the base channel address to which the terminal is assigned, with at least a first plurality of terminals assigned to one base channel address and at least one other terminal assigned to a different base channel address;

second means for receiving messages from said loop and for transmitting messages onto said loop;

third means for recognizing the receiving of a loop message in a channel assigned to the terminal;

fourth means responsive to the receiving of a null message in an assigned channel for transmitting in said channel a service request command message including the terminal address;

fifth means responsive to the receiving in an assigned channel of an echo of said service request command message for enabling said second means to receive and transmit data messages in assigned slots;

sixth means for executing commands received in an assigned slot;

seventh means set for inhibiting operation of said fourth and fifth means and inhibiting execution of selected commands by said sixth means;

eighth means responsive to receipt in an assigned slot, of a command message having an address, where the address is not that of the terminal, for setting said seventh means; and ninth means for resetting said seventh means responsive to a command message in an assigned slot, said command being either a device command addressed to the terminal or an unaddressed command executed by said sixth means irrespective of said seventh means, the execution of which functions to reset said seventh means.

\* \* \* \* \*